(12) United States Patent
Craft

(10) Patent No.: US 6,697,974 B2
(45) Date of Patent: Feb. 24, 2004

(54) METHOD AND APPARATUS FOR ADAPTIVELY COMPENSATING SKEWS DURING DATA TRANSMISSION ON A BUS

(75) Inventor: David John Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 09/804,799

(22) Filed: Mar. 14, 2001

(65) Prior Publication Data

US 2002/0174390 A1 Nov. 21, 2002

(51) Int. Cl.[7] ............................. G06K 5/04; G11B 5/00
(52) U.S. Cl. ..................................................... 714/700
(58) Field of Search ........................... 714/700; 713/503

(56) References Cited

U.S. PATENT DOCUMENTS 4,577,318 A * 3/1986 Whitacre et al. ............ 714/700
5,455,831 A * 10/1995 Bartow et al. ............... 714/700

* cited by examiner

Primary Examiner—Albert Decady
Assistant Examiner—Shelly A Chase
(74) Attorney, Agent, or Firm—Robert M. Carwell; Bracewell & Patterson, L.L.P.

(57) ABSTRACT

A method for adaptively compensating skews during data transmission on a bus is disclosed. A bus includes one or more groups of multiple signal paths. Each of the signal paths within a group is assigned a unique binary data value. During data transmissions, only one signal path within each group is activated at a time, and each activation of one of the signal paths represents its associated unique binary data value. Thus, a sequence of consecutive activations represents the same information as if the data were transmitted in parallel. Before signal transmission, a time delay between a transition on a first and a second of the signal lines is measured by utilizing a control frame. The time delay measurement is repeated to establish the relative time delays associated with all possible transitions on all the signal lines. In response to the measured time delays, an appropriate compensating delay is introduced accordingly before launching each transition on the signal lines. Such added delay compensates for the differences in delay (or skew) between the different transitions travelling along different signal paths.

20 Claims, 6 Drawing Sheets

METHOD AND APPARATUS FOR ADAPTIVELY COMPENSATING SKEWS DURING DATA TRANSMISSION ON A BUS

BACKGROUND OF THE INVENTION

1. Technical Field

The present invention relates to a method and apparatus for data transmission in general, and in particular to a method and apparatus for transmitting data on a bus. Still more particularly, the present invention relates to a method and apparatus for adaptively compensating skews during data transmission using cables over extended distances.

2. Description of the Prior Art

The technique of using a group of wires typically known as a bus to transmit data has been in common use since the early days of electronic computers. There are many advantages in using a single interconnecting scheme such as a bus for a computer system. For example, various subsystems within a computer system can be interfaced with each other via a bus. In addition, new devices and peripherals can easily be added or even be ported between computer systems that use a common bus. Furthermore, because a single set of wires can be shared among multiple sources and destinations, the cost associated with a bus implementation is relatively low.

However, for computer systems where bus traffic or throughput demands on input and output are relatively high, it is a major challenge to design a bus system capable of meeting such demands in an efficient manner. With conventional design, data are generally driven on to a bus, using logic voltage levels to encode and transmit a data bit in every wire within the bus, and this method of data transmission is sufficient for relatively narrow buses. But when wider buses are needed to meet the ever increasing throughput requirements, the problem of capacitive and inductive coupling between adjacent parallel bus wires and simultaneous switching of a large number of drivers with consequent peak current demand, becomes more significant. Thus, transitional coding is used to facilitate the transmission process. The transitional coded method of data transmission typically has one or more groups of four signal paths, and single transitions are sent in sequence down one of the possible four signal paths. Each such transition thus conveys two bits of self-clocked information (or data). For extended distance transmission over cables, each such group of four signal paths can be implemented as four twisted pairs. Logic level signals are converted into low-voltage differential signalling levels (LVDS), sent over the corresponding twisted pair, and reconverted back to logic levels at the other end of the cable using LVDS driver/receiver circuits.

During transmission, skew due to faster or slower signal propagation along different twisted pair signal paths within a cable, or through driver/receiver circuits, may limit the rate at which transitions can be sent. This is because signals sent along different paths must always arrive in correct order. The present disclosure provides a method and apparatus for adaptively compensating for such skews during transmission using the transitional coding method of data transmission, particularly over long cables.

SUMMARY OF THE INVENTION

In accordance with a preferred embodiment of the present invention, a bus includes one or more groups of multiple signal paths. Each of the signal paths within a group is assigned a unique binary data value. During data transmissions, only one signal path within each group is activated at a time, and each activation of one of the signal paths represents its associated unique binary data value. Thus, a sequence of consecutive activations represents the same information as if the data were transmitted in parallel. Before signal transmission, a time delay between a transition on a first and a second of the signal lines is measured by utilizing a control frame. The time delay measurement is repeated to establish the relative time delays associated with all possible transitions on all the signal lines. In response to the measured time delays, an appropriate compensating delay is introduced accordingly before launching each transition on the signal lines. Such added delay compensates for the differences in delay (or skew) between the different transitions travelling along different signal paths.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4a is an exemplary CTL_FRAME for measuring delay between a 00+ and a 11 − transition;

FIG. 4b is an exemplary CTL_FRAME for measuring delay between a 10+ and a 01+ transition;

DETAILED DESCRIPTION OF A PREFERRED EMBODIMENT

A. Transitional Coding Scheme

Figure 1:
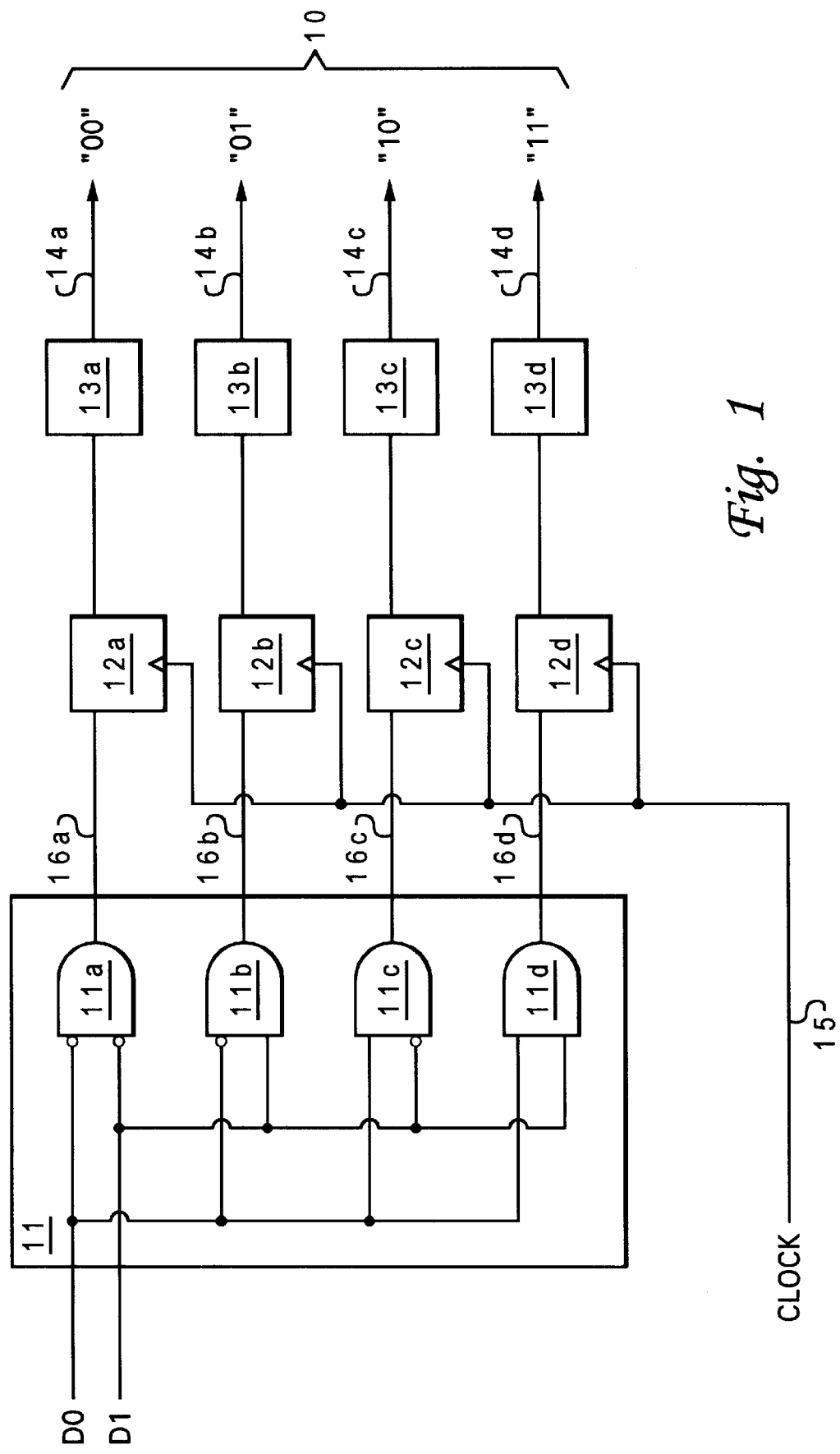
FIG. 1 is an exemplary implementation of a bus having a single group size of four, in accordance with a preferred embodiment of the present invention.

When using transitional coding, a bus is implemented as one or more groups of multiple signal lines. Only one of the signal lines within each group is activated at a time for data transmission. More precisely, such activation refers to a change of state of the signal line, while the remaining signal lines(s) of the group remain dormant. The number of bits of information conveyed by such state change depends on the number of signal lines within the group. Taking a four-bit wide conventional bus (i.e., a bus having four data lines) as an example, the transitional coding approach treats each wire as a signal line corresponding to a unique data value as follows: line 1—"00," line 2—"01," line 3—"10," and line 4—"11." During transmission, instead of driving every wire on the bus from a separate data bit value as is done in the prior art, only one signal line will be activated at a time. The activated signal line represents part or all of the data to be transmitted. Thus, in order to send an eight-bit address such as 1001 1100, line 3 will be activated in the first cycle to transmit "10," then line 2 will be activated in the second cycle to transmit "01," then line 4 will be activated in the third cycle to transmit "11," and finally, line 1 will be activated in the forth cycle to transmit "00." It is noted that four separate transitions (or four cycles) are required for transmitting an eight-bit address, as opposed to two cycles using the wires as a four-bit wide conventional bus.

Table I shows the number of bits of data that can be conveyed via a single transition, for various group sizes. Table I also shows the number of consecutive single transitions needed to convey the same number of bits of data as the width of the signal line (in other words, to transfer the same amount of data as a conventional bus of the same width). For example, with a group of four signal lines, only two bits of data can be conveyed via a single transition, thus, two consecutive transitions are needed to send four bits of data; and with a group of 16 signal lines, only four bits of data can be conveyed via a single transition, so four consecutive transitions are required to send 16 bits of data.

TABLE I

| group size (number of signal lines) | data bits per transition | transitions for group-size bits |
|---|---|---|
| 2 signal lines | 1 bit | 2 transitions |
| 4 signal lines | 2 bits | 2 transitions |
| 16 signal lines | 4 bits | 4 transitions |
| 256 signal lines | 8 bits | 32 transitions |

The bus sizes shown in Table I are only exemplary and not exhaustive. The bus sizes not shown in Table I are generally not a convenient fit for computer or data processing system requirements; however, one possible exception may be a bus size of eight signal lines, with each transition sending three bits of data. Thus, for a system that utilizes byte parity, three such transitions send 9 bits, which is very convenient for an 8-bit byte of data plus one parity bit.

B. Exemplary Implementation

Referring now to the drawings and in particular to FIG. 1, there is depicted an exemplary implementation of a bus 10 having a group size of four signal lines, in accordance with a preferred embodiment of the present invention. Data inputs D0 and D1 are initially sent to a decoder 11 that preferably includes four two-input AND gates 11a–11d with different negated inputs as shown in FIG. 1. The logic within decoder 11 ensures that only one of output lines 16a–16d can be activated in each clock cycle. Each output from AND gates 11a–11d is coupled to an input of a respective one of latches 12a–12d. Latches 12a–12d are preferably D flip-flops clocked by a clock signal 15. Each output from latches 12a–12d is then respectively coupled to one of drivers 13a–13d. In this exemplary embodiment, output signal transitions on lines 14a–14d from drivers 13a–13d represent binary values "00," "01," "10," and "11," respectively.

C. Data Propagation

Figure 2:
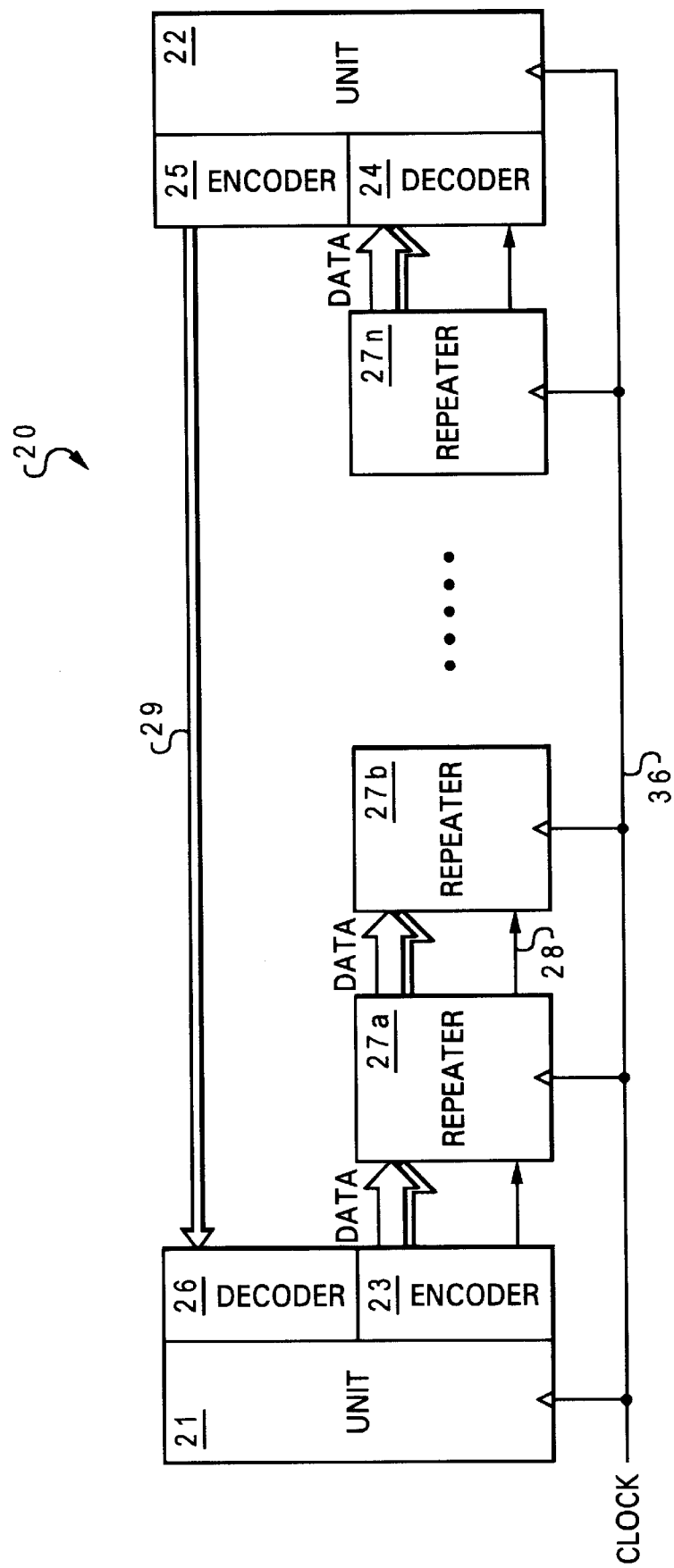
FIG. 2 is a block diagram of a synchronous transmission system, in accordance with a preferred embodiment of the present invention.

A transitional coding scheme is preferably implemented as a self-clocking transmission scheme with multiple repeaters coupled between a sending device and a receiving device. With reference now to FIG. 2, there is illustrated a block diagram of a synchronous transmission system 20, in accordance with a preferred embodiment of the present invention intended for transmission between two separate functional units on a large chip. As shown, synchronous transmission system 20 includes a sending unit 21, a receiving unit 22, and repeaters 27a–27d. Sending unit 21 includes an encoder 23 and a decoder 26. Receiving unit 22 includes a decoder 24 and an encoder 25. Data is synchronously transmitted from sending unit 21 to receiving unit 22. Synchronous transmission system 20 requires some form of synchronization among all the repeaters; thus, a distributed clock 36 is fed into sending unit 21, receiving unit 22, and repeaters 27a–27d via a respective clock-in terminal. With this embodiment, if the maximum separation between blocks (i.e., sending unit 21, repeaters 27a–27d, and receiving unit 22) is designed to be 2 mm and the delay is 263 picoseconds, for example, then a total period for clock signals might be chosen to be 600 picoseconds, with 300 picoseconds on the up cycle and 300 picoseconds on the down cycle. If the encoders and repeaters operate on either the rising or falling edges of clock 36, this allots 300 picoseconds between successive transitions from sending unit 21, allowing this same signal propagation time along a path between any two blocks. As two bits of data are sent per transition, this gives a data rate of 4 bits in 600 picoseconds, or about 800 Mbyte/second.

A control line 28 can be utilized for performing a RESET function. For example, if control line 28 is asserted when the signal from clock 36 is down, such assertion signals the start of a data transfer at the next clock transition (i.e., the signal from clock 36 is up). If control line 28 is asserted when the signal from clock 36 is up, such assertion initiates a RESET function, which also propagates as a control signal after the signal from clock 36 is up, thus propagating the RESET signal onward. A similar arrangement is used to provide a return path from receiving unit 22 back to sending unit 21 via a line 29, although no repeater is shown.

With the arrangement shown in FIG. 2, it is possible for a transition to get out of order on long paths if one path between the repeaters is much faster than the others. This is especially true if the system is not all on one chip, but consists of multiple chips in separate physical units connected by cables. One simple solution to such problem is to use a transmission rate that is slow enough to ensure each transitional-coded value always arrives at every respective receiving unit, even under the worst case tolerance, before launching the next transitional-coded value. However, such solution limits the rate of data transmission. A better solution is to measure skews between each of the signal lines, and then adaptively compensate for such skews before transmitting the signals.

D. Skew Measurements

The basic principle of skew measurement is to send a special type of control frame, CTL_FRAME, reserved for this purpose. Such a CTL_FRAME preferably begins with the usual 01+ transition to identify it as a CTL_FRAME, followed by a 11+ transition, although any other combination is also acceptable. In response to such CTL_FRAME, all devices on a bus will propagate the above-mentioned two transitions and any remaining transitions needed to complete a skew measurement. The remaining, for example, eight transitions, are arranged to set up the state of each signal line within the bus initially, if necessary. Then, either a 00+ transition, or a 10+ follows, to start the time delay measurement in the receiving port of each device. The transition to be measured occurs next, and it stops the time delay measurement process. Finally, normalization and/or NULL transitions may be added to return the signal lines back to the 0000 starting state to complete the skew measurement.

Figure 3:
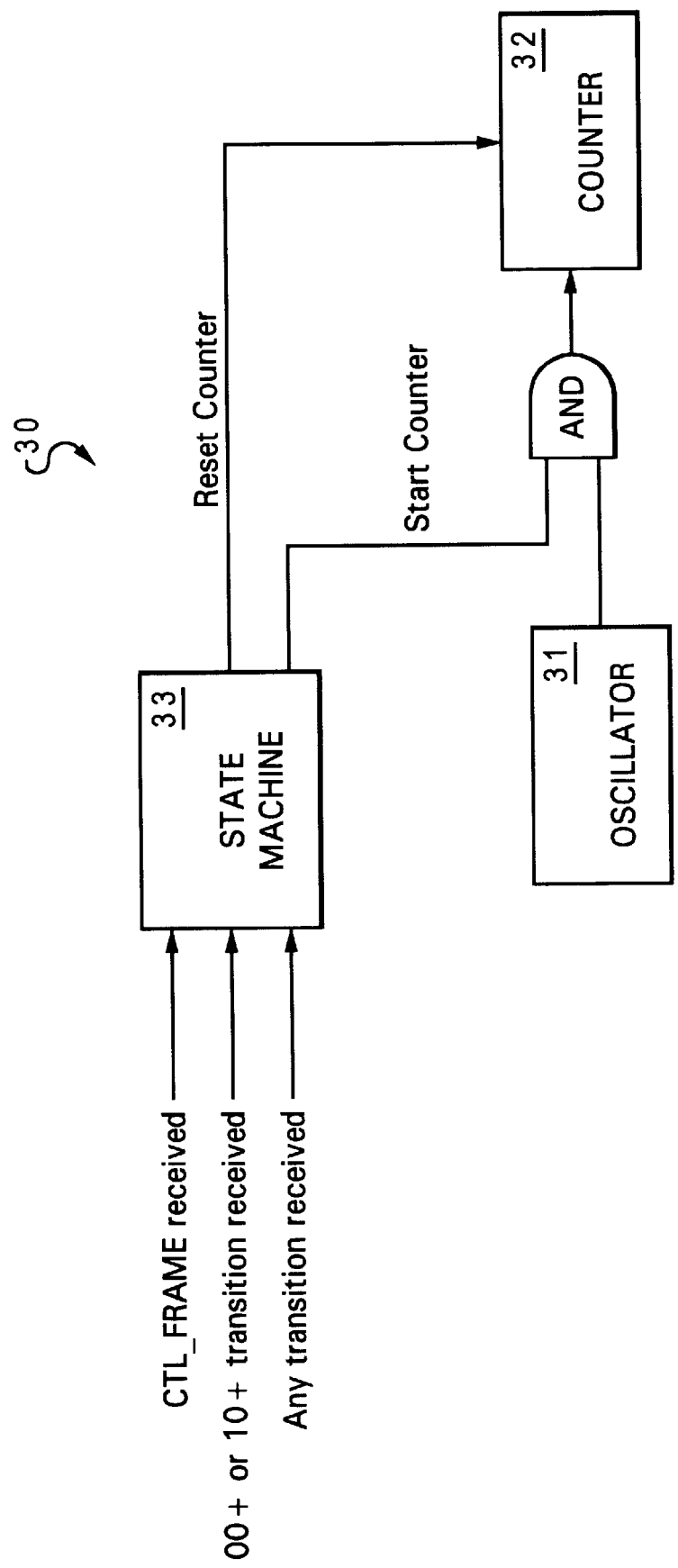
FIG. 3 is a block diagram of a delay time measurement circuit, in accordance with a preferred embodiment of the present invention.

Referring now to FIG. 3, there is depicted a block diagram of a delay time measurement circuit 30, in accordance with a preferred embodiment of the present invention. The input port of each device (which includes units 21–22 and repeaters 27a–27n) in FIG. 2 has a delay time measurement circuit that resembles delay time measurement circuit 30. With delay time measurement circuit 30, time is measured in terms of arbitrary time units, generated locally by an oscillator 31 based on a timing delay circuit coupled to a counter 32. Oscillator 31 needs to be three times or four times faster than the normal data transition rate, so the skew can be measured to ⅓ to ¼ of the normal data transition rate. Delay time measurement circuit 30 operates in response to the reserved special skew measurement CTL_FRAME. Counter 32 is reset when the 11+ transition is detected. Counter 32 begins counting time units when either a 00+ or a 10+ transition is detected, and stops counting when the next transition of any kind occurs. A state machine 33 controls delay time measurement circuit 30 through the following three states:

| STATE | ACTION | CONNECTIVE |
|-------|--------|------------|
| [0] | none | CTL_FRAME received --> [1] |
| [1] | reset counter | 00+ or 10+ transition --> [2] |
| [2] | start counter | any transition --> [0] |

Figures 4A, 4B:
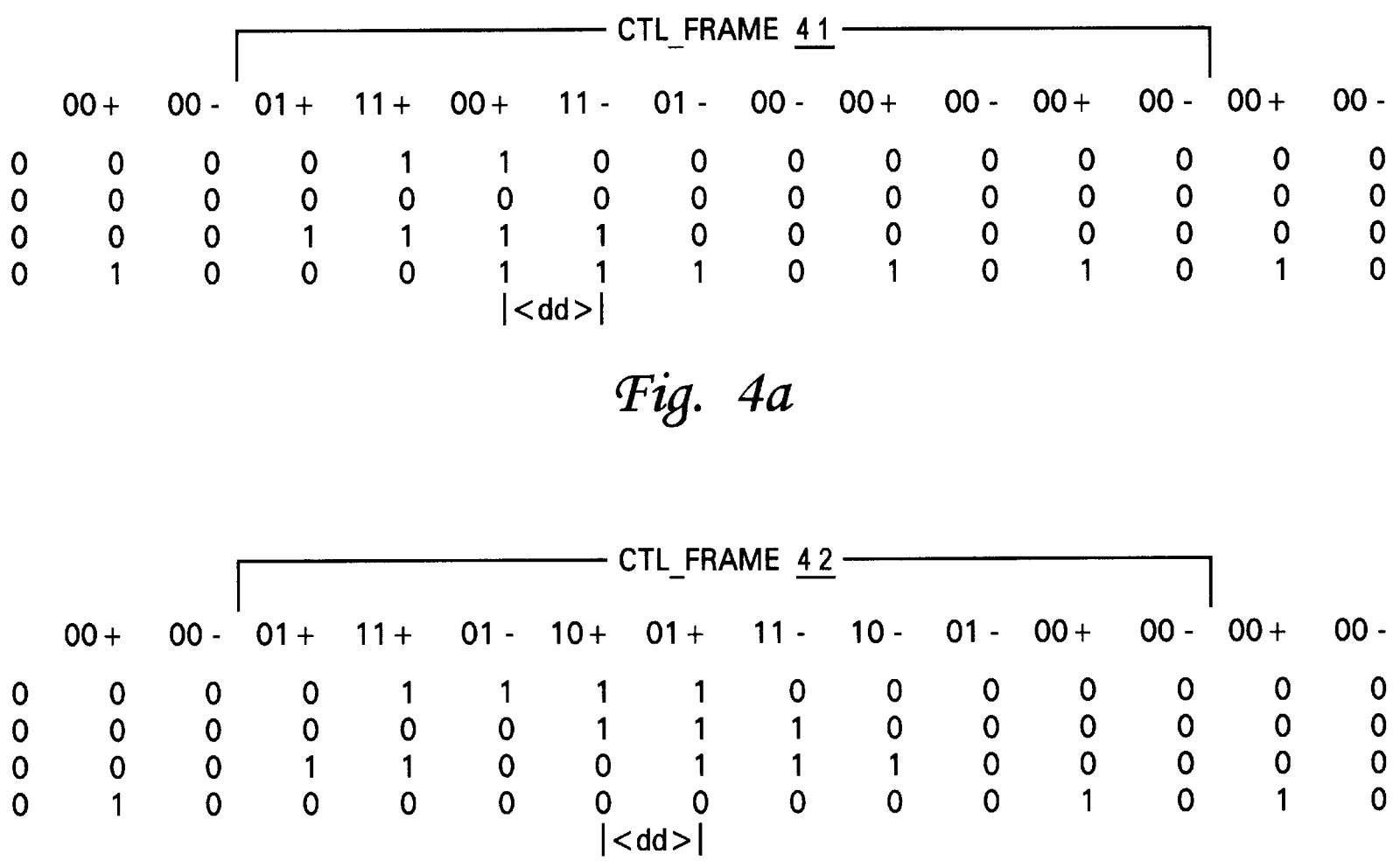

An exemplary CTL_FRAME 41 for delay measurement is shown in FIG. 4a, using the +/- notation and showing the actual binary state of four different signal lines. As shown, a CTL_FRAME 41 is arranged to measure the delay between a positive line 0 (or 00+ transition) and a negative line 3 (or 11- transition). An accumulated counter value <dd> represents the measured time delay at the receiving device between the arrival of a 00+ transition and a 11 - transition. A preferred size for delay counter 32 (from FIG. 3) to perform such function is 8 bits, which allows delay counter 32 to accumulate up to 256 local oscillator time measurement units. Another exemplary CTL_FRAME 42 for measuring delay between a 10+ and a 01+ transition is shown in FIG. 4b. CTL_FRAME 42 is arranged to measure the delay between a positive line 2 (or 10+ transition) and a positive line 1 (or 01+ transition). The accumulated counter value <dd> now represents the measured time delay at the receiving device between the arrival of a 10+ transition and a 01+ transition.

The transitions of CTL_FRAMES used for skew measurement are sent at a slower rate than normal, but at exactly spaced equal intervals. For such special measurement frames, the local delay time measurement oscillator in the device originating the frame is divided by 128 to launch each outbound transition rather than using the arrival of the next incoming transition and the clock. If the oscillator at the receiving device for receiving such a frame were at exactly the same frequency as the oscillator at the originating device, the measured delay count would be exactly 128 if no skew occurred in the signal paths between the two devices.

The normal command set for all devices on a bus should include the ability to select a specific device and exchange data between the device and the loop terminator/adapter device. For skew measurement purposes, at least the following two capabilities should be included in the command set. First, it must be possible to set a selected device as a source of the CTL_FRAME skew measurement pattern and load a desired CTL_FRAME pattern to the device. This is then propagated to perform the skew measurement using the local oscillator as the time source, divided by 128, as described above. After that, the device should be able to revert back to its normal state. Every subsequent loop device should then have a delay counter value representing the measurement it made of the delay as seen by its input circuits. This allows any device on a bus, including a loop terminator/adapter device, to be selected as a source for a specified test CTL_FRAME measurement pattern, and to launch the transitions for that pattern at a regular rate, derived from its local oscillator. Second, after the completion of a test CTL_FRAME pattern, it must be possible to select any downstream device and retrieve its delay counter value. Once retrieved, the process is repeated with other CTL_FRAME patterns in order to obtain measured values for delays between 00+ or 10+ and all other possible transitions.

In general, the retrieved counter value will be different for each type of transition, due to the different delays in driver circuits, different delays along cable paths, and differences between the receiver circuit thresholds and the rise/fall times of the received signals. At an assumed 0.4 nanosecond local oscillator pulse rate, and say a total of 9 frames for each measurement and counter value retrieval, it will take around (0.4×128×10×9) or under 4.5 microseconds for each type of transition, if all the frames are sent at the slower rate. This is necessary to ensure there are no errors, of course, since skew has not yet been compensated. For the 8 possible transition skew measurements required, the total time is under 40 microseconds. It is not likely the local oscillators in each device will change frequency significantly in such a short time.

Figure 5:
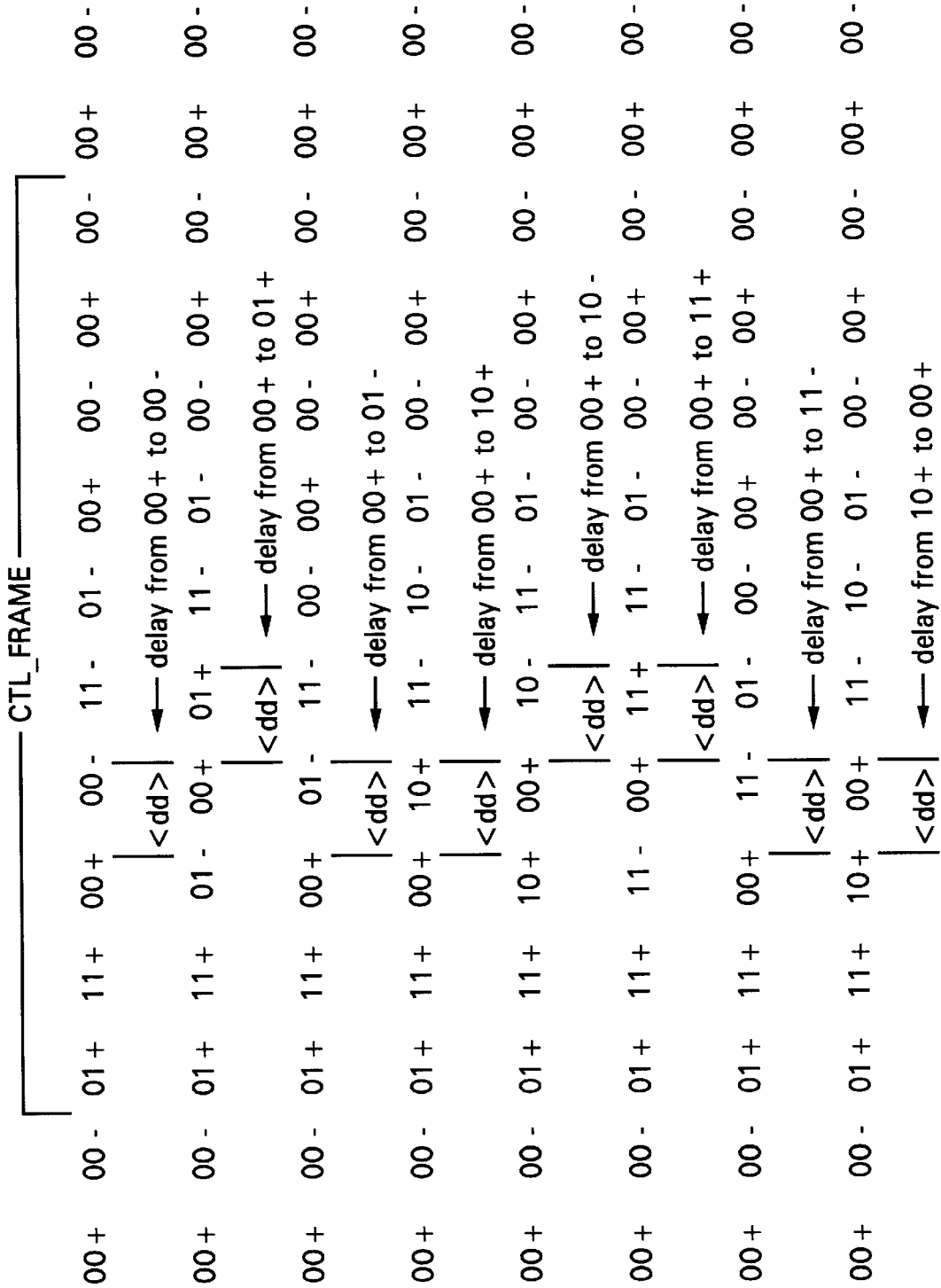
FIG. 5 is an exemplary set of CTL_FRAME patterns required to measure skews from a given source device in +/− notation.

An exemplary set of CTL_FRAME patterns required to measure the skew from a given source device is illustrated in FIG. 5 in +/- notation. A 00+ transition is first used as a reference to measure all seven possible subsequent transitions. Finally, a 10+ transition is used as a reference to measure the delay to a 00+ transition. This allows skews for all four signal lines, including both positive and negative transitions, to be established. If all delay values were identical, no skew adjustments are needed. Should delay values differ, however, additional delays are then inserted in the faster paths to compensate for the skew.

E. Skew Compensation

Figure 6:
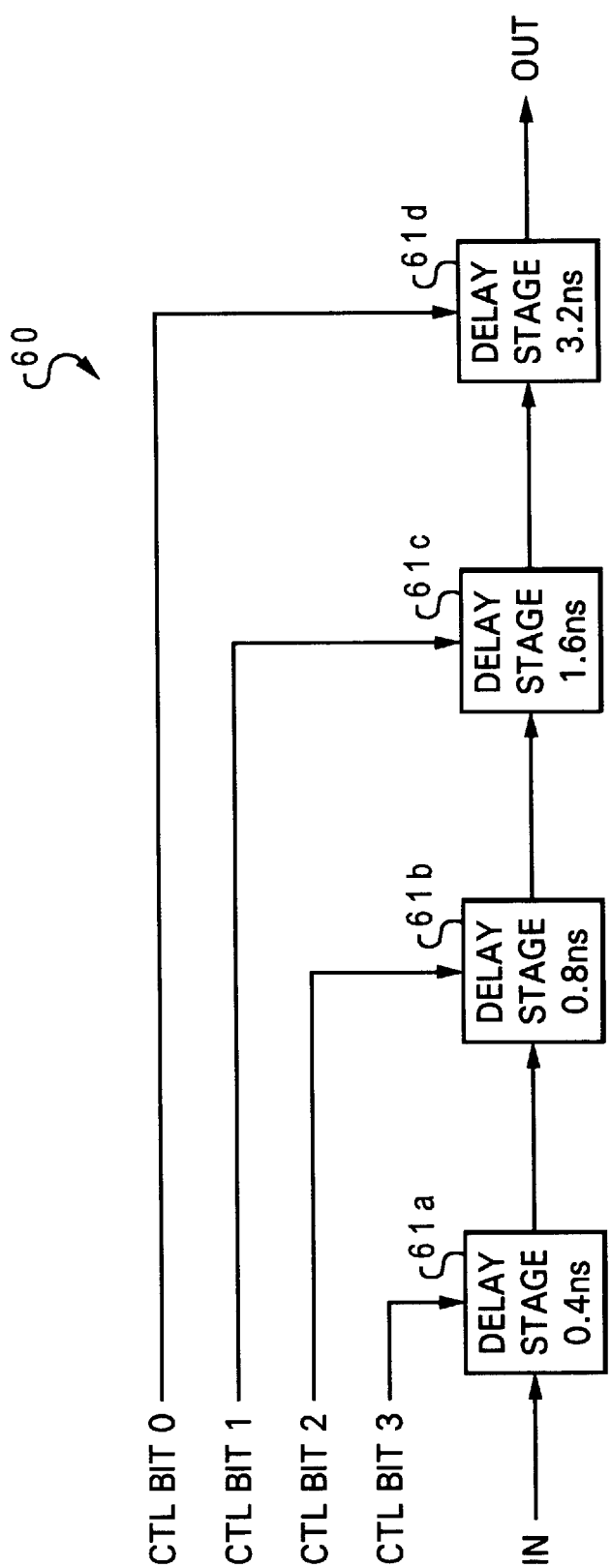
FIG. 6 is block diagram of a skew compensation circuit, in accordance with a preferred embodiment of the present invention.

With reference now to FIG. 6a, there is depicted a skew compensation circuit 60 for one of the four signal paths, in accordance with a preferred embodiment of the present invention. This example assumes a 4-bit delay control register, bit 0 as the most significant bit and bit 3 as the least significant bit. The binary values of delay stages 61a–61d allow overall delay to be increased in 16 steps, of 0.4 ns per step. Nominally, the resolution of each step in the delay adjustment should be about the same as the time delay measurement circuitry in the receiver device. Thus, for a 1.5 nanoseconds transition rate, this would be in the region of 0.4 or 0.5 nanosecond or so.

Another approach would be to use a chain of equal small delay stages, and the control register enables the delays from the start of the chain only up to a certain point. Yet another alternative is to use a local hi-speed oscillator to decrement counters that are initially set from the appropriate delay control register value on the incoming signal. The output signal is delayed until the counter reaches zero. Both of the above-mentioned schemes avoid the monotonicity problem if the binary delay values are not accurate to better than the smallest unit of delay. Both schemes ensure that an increase in the value of the delay control register always results in a longer delay.

As has been described, the present invention provides a method and apparatus for adaptively compensating skews during data transmission on a bus when transitional coding method of data transmission is being used. The method and architecture discussed allows skews to be measured at any point between any two devices on a signal path loop. Once the skews for both outbound and inbound loop signal paths are compensated, operation of the loop at normal speed can begin.

While the invention has been particularly shown and described with reference to a preferred embodiment, it will be understood by those skilled in the art that various changes in form and detail may be made therein without departing from the spirit and scope of the invention.

What is claimed is:

1. A method for adaptively compensating skews during data transmission on a bus, wherein said bus includes a plurality of signal lines, said method comprising the steps of:

assigning each of said plurality of signal lines within said bus a unique binary value;

activating less than all of said plurality of signal lines for a data transmission, wherein an activation of a signal line represents its associated unique binary value;

measuring a time delay between a transition on a first of said plurality of signal lines and a transition on a second of said plurality of signal lines by utilizing a control frame;

repeating said measuring step for transitions between different combinations of two of said plurality of signal lines; and injecting an appropriate compensating delay in each of said plurality of signal lines when transmitting data on said plurality of signal lines in response to said measured time delays.

2. The method according to claim 1, wherein said activating step further includes a step of activating only one of said plurality of data lines for each data transmission.

3. The method according to claim 1, wherein said method further includes a step of performing a plurality of consecutive activations, wherein an aggregate of said consecutive activations represents an identical information when the data are transmitted within said bus in parallel.

4. The method according to claim 1, wherein said activating step is performed synchronously.

5. The method according to claim 1, wherein said measuring step begins in response to a control frame.

6. The method according to claim 1, wherein said measuring step is performed by an oscillator and a counter.

7. The method according to claim 1, wherein said method further includes a step of decoding activated data lines in accordance with their respective assigned unique binary value.

8. An apparatus for adaptively compensating skews during data transmission on a bus, wherein said bus includes a plurality of signal lines, said apparatus comprising:

means for assigning each of said plurality of signal lines within said bus a unique binary value;

means for activating less than all of said plurality of signal lines for a data transmission, wherein an activation of a signal line represents its associated unique binary value;

means for measuring a time delay between a transition on a first of said plurality of signal lines and a transition on a second of said plurality of signal lines by utilizing a control frame;

means for repeating said measuring step for transitions between different combinations of two of said plurality of signal lines; and means for injecting an appropriate compensating delay in each of said plurality of signal lines when transmitting data on said plurality of signal lines in response to said measured time delays.

9. The apparatus according to claim 8, wherein said activating means further includes a means for activating only one of said plurality of data lines for each data transmission.

10. The apparatus according to claim 8, wherein said apparatus further includes a means for performing a plurality of consecutive activations, wherein said aggregate of said of consecutive activations represents an identical information when the data are transmitted within said bus in parallel.

11. The apparatus according to claim 8, wherein said activating means is performed synchronously.

12. The apparatus according to claim 8, wherein said measuring means begins measuring in response to a control frame.

13. The apparatus according to claim 8, wherein said measuring means includes an oscillator and a counter.

14. The apparatus according to claim 8, wherein said apparatus further includes a means for decoding activated data lines in accordance with their respective assigned unique binary value.

15. A data processing system capable of adaptively compensating skews during data transmission on a bus, wherein said bus includes a plurality of signal lines, said data processing system comprising:

a plurality of devices coupled to each other via said bus, wherein said bus includes a plurality of signal lines;

means for assigning each of said plurality of signal lines within said bus a unique binary value;

means for activating less than all of said plurality of signal lines for a data transmission, wherein an activation of a signal line represents its associated unique binary value;

means for measuring a time delay between a transition on a first of said plurality of signal lines and a transition on a second of said plurality of signal lines by utilizing a control frame;

means for repeating said measuring step for transitions between different combinations of two of said plurality of signal lines; and means for injecting an appropriate compensating delay in each of said plurality of signal lines when transmitting data on said plurality of signal lines in response to said measured time delays.

16. The data processing system according to claim 15, wherein said activating means further includes a means for activating only one of said plurality of data lines for each data transmission.

17. The data processing system according to claim 15, wherein said data processing system further includes a means for performing a plurality of consecutive activations, wherein said aggregate of said of consecutive activations represents an identical information when the data are transmitted within said bus in parallel.

18. The data processing system according to claim 15, wherein said activating means is performed synchronously.

19. The data processing system according to claim 15, wherein said measuring means begins measuring in response to a control frame.

20. The data processing system according to claim 15, wherein said measuring means includes an oscillator and a counter.

* * * * *